US009292939B2

(12) United States Patent
Mineshita

(10) Patent No.: US 9,292,939 B2
(45) Date of Patent: Mar. 22, 2016

(54) INFORMATION PROCESSING SYSTEM, INFORMATION PROCESSING METHOD AND PROGRAM

(71) Applicant: NEC Corporation, Minato-ku, Tokyo (JP)

(72) Inventor: Satoshi Mineshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 96 days.

(21) Appl. No.: 14/176,569

(22) Filed: Feb. 10, 2014

(65) Prior Publication Data

US 2014/0226857 A1 Aug. 14, 2014

(30) Foreign Application Priority Data

Feb. 13, 2013 (JP) .................. 2013-025480

(51) Int. Cl.
*G06K 9/00* (2006.01)
*G06T 7/20* (2006.01)
*H04N 5/225* (2006.01)

(52) U.S. Cl.
CPC .......... *G06T 7/2093* (2013.01); *G06K 9/00771* (2013.01); *G06T 2207/10016* (2013.01); *G06T 2207/30196* (2013.01); *G06T 2207/30232* (2013.01); *G06T 2207/30241* (2013.01)

(58) Field of Classification Search
CPC .................................. G06K 9/00; G06T 7/00
USPC ........... 382/103, 107, 236; 348/169–172, 352
See application file for complete search history.

(56) References Cited

U.S. PATENT DOCUMENTS 8,300,102 B2 * 10/2012 Nam et al. .................... 348/169
9,007,445 B2 * 4/2015 Oikawa ................... G06F 3/011
345/632

FOREIGN PATENT DOCUMENTS

JP 2009-17416 A 1/2009

* cited by examiner

*Primary Examiner* — Abolfazl Tabatabai

(57) ABSTRACT

Provided are an information processing system, an information processing method and a program that can detect probability whether individuals contacted or not outside the imaging ranges of surveillance cameras. The invention includes: an image receiving unit that receives input of images captured by a plurality of imaging apparatuses including a first surveillance camera and a second surveillance camera; and a list generating unit that outputs information on two individuals when each of the two individuals satisfies the conditions of a moment of disappearing from the frame of an image of one of the surveillance cameras, and a moment of appearing in the frame of an image of the other one of the surveillance cameras.

6 Claims, 5 Drawing Sheets

INFORMATION PROCESSING SYSTEM, INFORMATION PROCESSING METHOD AND PROGRAM This application is based upon and claims the benefit of priority from Japanese patent application No. 2013-25480, filed on Feb. 13, 2013, the disclosure of which is incorporated herein in its entirety by reference.

BACKGROUND

The present invention relates to an information processing system, an information processing method and a program.

In recent years an increasing number of surveillance cameras are installed in busy areas, such as inside stores, on station premises and streets. However installing surveillance cameras without blind spots is difficult because of cost and other reasons. Therefore Patent Publication JP-A-2009-017416 discloses an apparatus that effectively displays images captured by surveillance cameras on a monitoring screen, and calculates an estimated arrival time of an intruder to an area of each monitoring camera, and displays the estimated arrival time.

SUMMARY

The apparatus according to Patent Publication JP-A-2009-017416, however, simply efficiently monitors individuals using surveillance cameras, calculating the estimated time. In other words, incidents that occur outside the imaging ranges of the surveillance cameras are not considered at all. But in actual scenes, an individual who commits a deliberate crime often does so by recognizing the blind spots of the surveillance cameras in advance, and choosing an area outside the target ranges of the surveillance cameras.

With the foregoing in view, it is an object of the present invention to provide an information processing system, an information processing method, and a program that can detect probability of contacts of individuals outside the imaging range of the surveillance cameras.

An information processing system according to the present invention includes: an input unit that receives input of images captured by a plurality of imaging apparatuses including a first imaging apparatus and a second imaging apparatus: and an output unit that outputs information on two individuals when each of the two individuals satisfies conditions of a moment of disappearing from the frame of an image of one of the first imaging apparatus and the second imaging apparatus and a moment of appearing in the frame of an image of the other one of the first imaging apparatus and the second imaging apparatus.

An information processing method according to the present invention is for an information processing system to execute: receiving input of images captured by a plurality of imaging apparatuses, including a first imaging apparatus and a second imaging apparatus; and outputting information on two individual when each of the two individuals satisfies the conditions of a moment of disappearing from the frame of an image of one of the first imaging apparatus and the second imaging apparatus and a moment of appearing in the frame of an image of the other one of the first imaging apparatus and the second imaging apparatus.

A program according to the present invention is for a computer to execute: processing to receive input of images captured by a plurality of imaging apparatuses, including a first imaging apparatus and a second imaging apparatus; and processing to output information on two individuals when each of the two individuals satisfies the conditions of a moment of disappearing from the frame of an image of one of the first imaging apparatus and the second imaging apparatus and a moment of appearing in the frame of an image of the other one of the first imaging apparatus and the second imaging apparatus.

In the present invention, "unit", "device", "apparatus" and "system" do not simply refer to physical units, but include the case of implementing the functions of the "unit", "device", "apparatus" or "system" by software. The functions of one "unit", "device", "apparatus" or "system" may be implemented by two or more physical units or apparatuses, or the functions of two or more "units", "devices", "apparatuses" or "systems" may be implemented by one physical unit or apparatus.

The present invention can provide an information processing system, an information processing method or a program that can detect probability of contacts of individuals outside the imaging ranges of the surveillance cameras.

DETAILED DESCRIPTION

Embodiments of the present invention will now be described. In the following description and drawings referred to, the same or similar composing elements are denoted with a same or similar reference symbol respectively.

1 Exemplary Embodiment 1

FIG. 1 to FIG. 4 are drawings for describing Exemplary Embodiment 1. This embodiment will now be described with reference to these drawings.

1.1 Overview

An overview of this embodiment will be described. Many surveillance cameras are now installed for security purposes in busy areas, such as inside stores, on station premises, and on streets. However installing surveillance cameras without blind spots (areas that surveillance cameras cannot capture images) is difficult because of installation costs. An individual who commits a deliberate crime is more likely to recognize the blind spots of surveillance cameras in advance, and commit such a crime as buying and selling illegal products in a blind spot.

Further it is also necessary to identify how individuals contact each other in the blind spots of the surveillance cameras to specify the infection route of a new virus.

In the information processing system according to this embodiment, individuals who may contact with each other in blind spots of surveillance cameras are determined, and a combination of these individuals can be outputted. Hence the information system according to this embodiment can interpolate the blind spots of the surveillance camera to a certain degree.

For this purpose, the information processing system according to this embodiment calculates the traveling time of an individual between surveillance cameras by tracking the individual between the surveillance cameras, and an individual whose traveling time is longer than normal traveling time is marked, and it is checked whether there is another individual who traveled at a travelling time longer than the normal traveling time in the same section and in the same time zone. Thereby probability of contact of these individuals between the surveillance cameras is determined. It is possible to map the travelling time not only between two surveillance cameras, but also among a plurality of cameras, whereby probability of contact of individuals can be determined at each location.

1.2 Functional Configuration of Information Processing System

Figure 1:
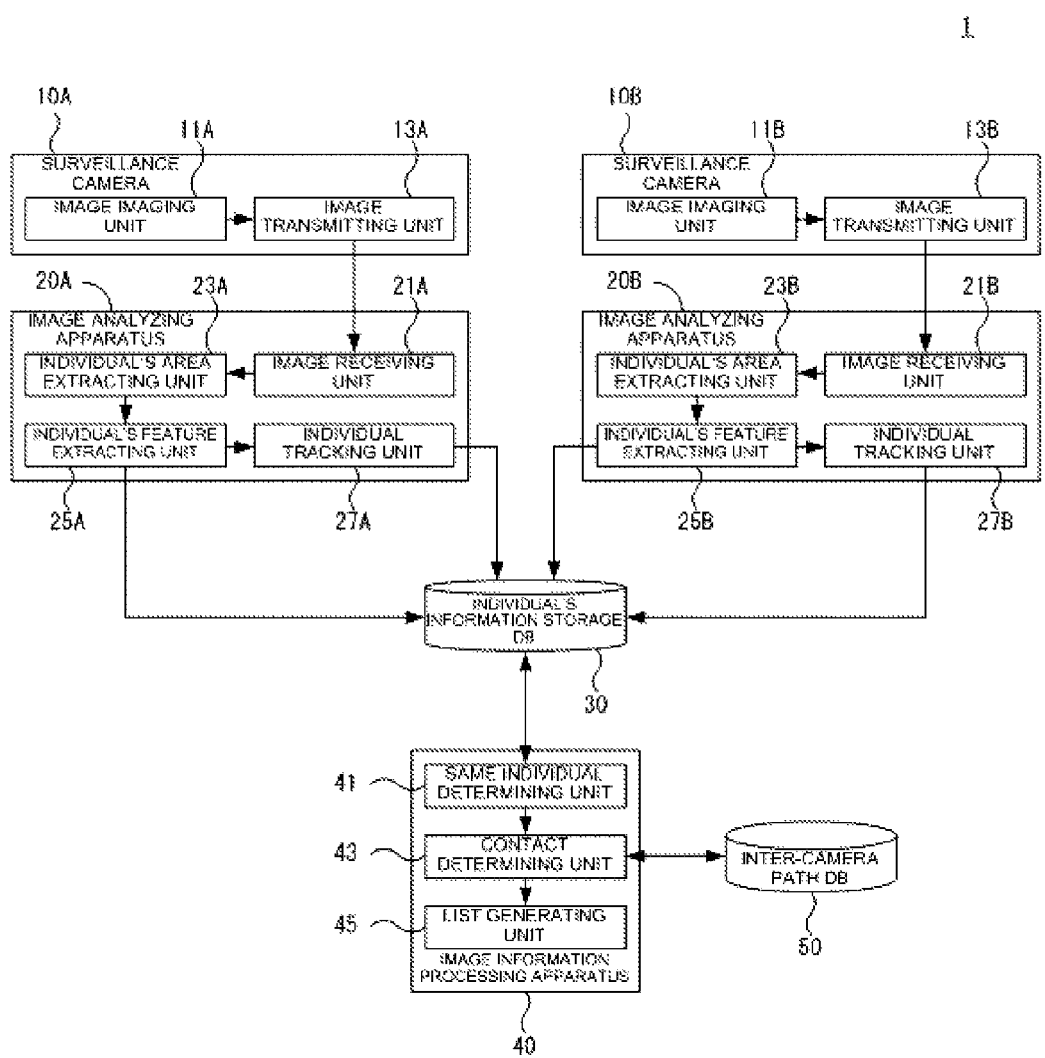
FIG. 1 is a functional block diagram depicting a general configuration of an information processing system according to Exemplary Embodiment 1.

Now a functional configuration of the information processing system 1 according to this embodiment will be described with reference to FIG. 1. FIG. 1 is a diagram depicting the functional configuration of the information processing system 1. As illustrated in FIG. 1, the information processing system 1 includes a surveillance camera 10 (surveillance cameras 10A and 10B are collectively called "surveillance camera 10"), an image analyzing apparatus 20 (image analyzing apparatuses 20A and 20B are collectively called "image analyzing apparatus 20"), an individual's information storage data base (DB) 30, an image information processing apparatus 40 and an inter-camera path DB 50. The functional configuration of these composing elements will now be described sequentially.

In the example in FIG. 1, there are two surveillance cameras 10 and two image analyzing apparatuses 20 which are installed on the surveillance cameras 10 respectively, but the numbers of surveillance cameras 10 and image analyzing apparatuses 20 are not limited to this, and three or more surveillance cameras 10 and image analyzing apparatuses 20 may be used. One image analyzing apparatus 20 may analyze images captured by a plurality of surveillance cameras 10.

The surveillance camera 10 includes an image imaging unit 11 (image imaging units 11A and 11B are collectively called "image imaging unit 11") that capture an image, and an image transmitting unit 13 (image transmitting units 13A and 13B are collectively called "image transmitting unit 13") that transmits an image captured by the image imaging unit 11 to the image analyzing apparatus 20 via cable or radio communication.

Concrete examples of communication for the surveillance camera 10 to transmit an image to the image analyzing apparatus 20 are: cable communication using a BNC cable, a telephone line, an Ethernet® cable or the like, and radio communication using a microwave line, a radio LAN or the like. Communication via Internet is also possible.

The image analyzing apparatus 20 is an apparatus that generates an individual's information by analyzing an image captured by the surveillance camera 10. The image analyzing apparatus 20 includes an image receiving unit 21 (image receiving units 21A and 21B are collectively called "image receiving unit 21"), an individual's area extraction unit 23 (individual's area extracting units 23A and 23B are collectively called "individual's area extracting unit 23"), an individual's feature extracting unit 25 (individual's feature extracting units 25A and 25B are collectively called "individual's feature extracting unit 25"), and an individual tracking unit 27 (individual tracing units 27A and 27B are collectively called "individual tracking unit 27").

The image receiving unit 21 receives an image captured by the surveillance camera 10. The individual's area extracting unit 23 detects an individual's area in an image received by the image receiving unit 21 and extracting the individual's area. Here "individual's area" refers to a general image of an individual captured in an image captured by the surveillance camera 10, an image of a portion that is recognized as a part of an individual (e.g. face, upper half of body), and coordinates information corresponding to these images, for example.

The individual's feature extracting unit 25 calculates individual's feature data from the individual's area extracted by the individual's area extracting unit 23, and stores the individual's feature data, along with the surveillance camera ID that is uniquely assigned to each surveillance camera 10, in the individual's information storage DB 30. Here individual's feature data is data for uniquely determining the extracted individual, and could include a part of or a combination of facial features, height, gender, age, color of clothing, pattern of clothing, body shape, hair style, accessories and gait.

The individual's tracking unit 27 tracks an individual in the images captured at a same angle of view by detecting a same individual between a previous image and a current image (between frames). Since the individual tracking unit 27 can specify a moment when the same individual appeared in frames and disappeared from frames, the individual tracking unit 27 corresponds the individual's feature data and the surveillance camera ID with the moments, and stores the data in the individual's information storage DB.

The individual's information storage DB 30 is a data base for storing individual's feature data that is outputted from the image analyzing apparatus 20 and the moments when each individual appeared in or disappeared from the frame of each surveillance camera 10.

The image information processing apparatus 40 is an apparatus that can output a list of combinations of individuals who may have contacted with each other based on the individual's information stored in the individual's information storage DB. The image information processing apparatus 40 includes a same individual determining unit 41, a contact determining unit 43, and a list generating unit 45.

The same individual determining unit 41 determines whether each individual captured by each surveillance camera 10 is the same individual based on the individual's feature data stored in the individual's information storage DB 30, so as to organize the movement of each individual in a time series, based on the moments when each individual appears in or disappears from the frames of the images captured by each surveillance camera 10. Whether each individual is the same individual or not can be determined depending on whether the degree of similarity of the individual's feature data is a threshold or more or not, for example.

The contact determining unit 43 determines the probability of contact of individuals by specifying a time zone when each individual was not captured by each surveillance camera 10 (that is, when each individual was outside the imaging range (blind spot) of each surveillance camera 10). Details on this method will be described later.

The list generating unit 45 generates a contact list to view at a glance the combinations of individuals who may have contacted, and the surveillance cameras 10 between which the combination of individuals were likely to have contacted each other, based on the contact determination content by the contact determining unit 62, and outputs this contact list.

The inter-camera path DB is a data base to store the average traveling time between cameras, from disappearing from the frame of an image of a surveillance camera 10 to appearing in the frame of an image of another surveillance camera 10, for all possible combinations among the installed surveillance cameras 10.

1.3 Processing Flow

Figure 2:
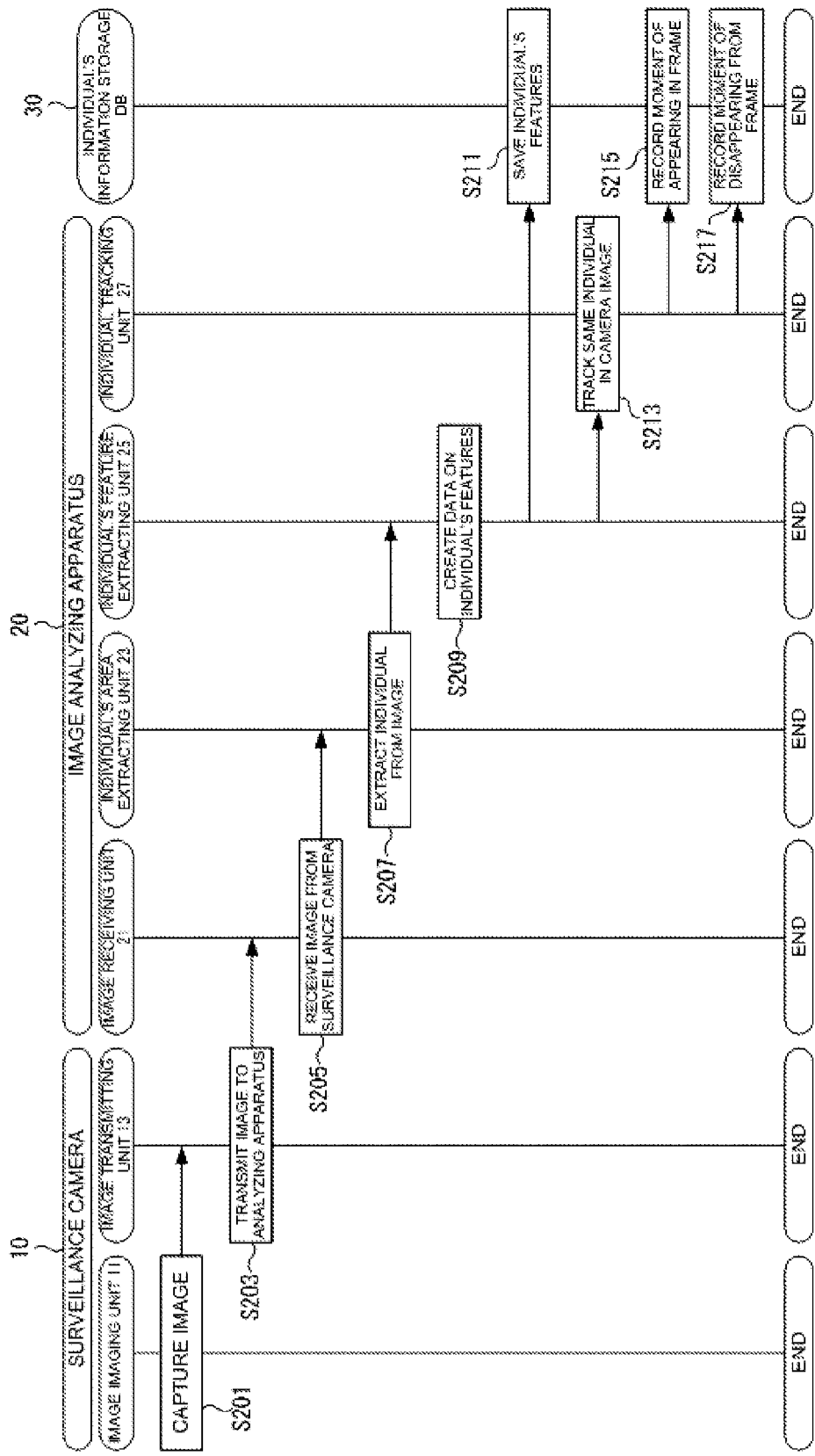
FIG. 2 is a flow chart depicting a processing flow of the information processing system in FIG. 1.
Figure 3:
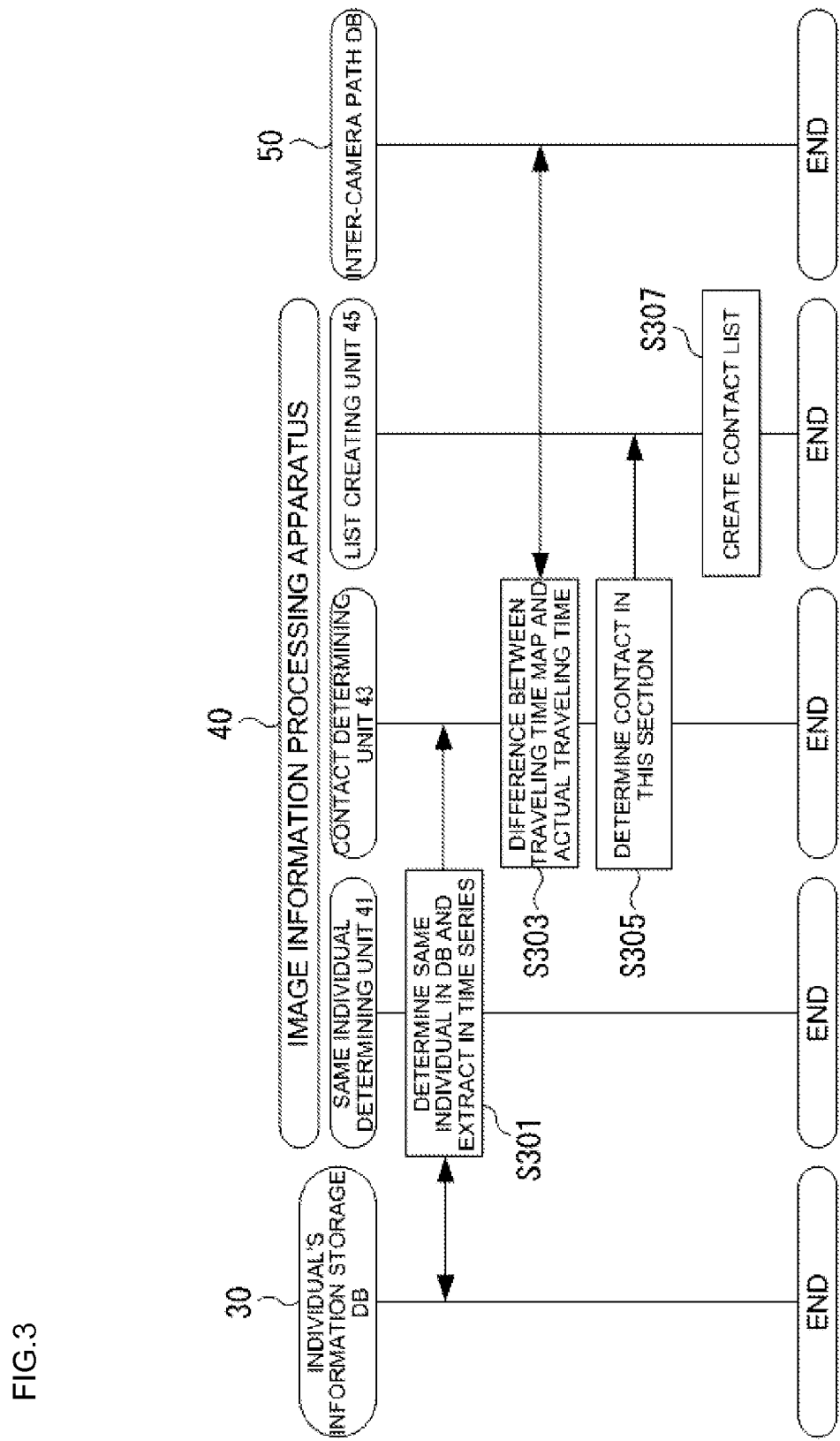
FIG. 3 is a flow chart depicting a processing flow of the information processing system in FIG. 1.

The processing flow of the information processing system 1 will now be described with reference to FIG. 2 and FIG. 3. FIG. 2 and FIG. 3 are flow charts depicting the processing flow of the information processing system 1 according to this embodiment. In the following description on the processing flow, it is assumed that one key individual is tagged, and a list of individuals to whom this key individual is likely to have contacted between the surveillance cameras 10A and 10B is generated.

Each of the following processing steps can be executed in an arbitrary sequence or in parallel to the extent that no inconsistency is generated. Another step may be added between processing steps. One step shown in the flow chart may be executed as a plurality of steps, or a plurality of steps shown in the flow chart may be executed as one step.

1.3.1 Processing Flow Related to Individual's Information Generation

The processing flow until the image analyzing apparatus 20 generates the individual's information will be described first with reference to FIG. 2.

The surveillance camera 10 captures an image of an imaging area (imaging target area) from the installed location using the image imaging unit 11 (S201), and transmits this image from the image transmitting unit 13 to the image analyzing apparatus 20 (S203).

The image analyzing apparatus 20 receives the image captured by the surveillance camera 10 via the image receiving unit 21 (S205). The individual's area extracting unit 23 analyzes the image received by the image receiving unit 21, and if an individual has been captured in an image, the individual's area extracting unit 23 extracts the individual's area related to this individual (S207). The individual's feature extracting unit 25 calculates the individual's feature data for this individual's area (S209), and then stores this individual's feature data in the individual's information storage DB 30 (S211).

The individual tracking unit 27 compares the individual's feature data of the previous frame and the individual's feature data of the current frame that continues from the previous frame, and if it is determined that these individuals are the same, the individual tracking unit 27 can track this individual (S213). By performing this tracking processing for many frames, the individual tracking unit 27 can specify a moment when each individual appeared in frames and a moment when each individual disappeared from the frames. In concrete terms, if it is determined that an individual appears in the image for a first time, the individual tracking unit 27 stores this moment in the individual information storage DB 30 as a moment when the individual appeared in the frame (S215). If an individual who existed in the previous frame disappears, the individual tracking unit 27 stores this moment in the individual information storage DB 30 as a moment when the individual disappeared from the frame (S217).

1.3.2 Processing Flow Related to Contact List Creation

The processing flow until the image formation processing apparatus 40 creates the contact list will be described next with reference to FIG. 3.

The same individual determining unit 41 of the image information processing apparatus 40 specifies a same individual captured in each image based on the individual's feature data of which surveillance camera 10 stored in the individual's information storage DB 30, and extracts each moment when this individual appears in/disappears from the frames of images of each surveillance camera 10 in a time series (S301).

The contact determining unit 43 compares the traveling time of this individual between the images of the surveillance cameras 10 (the time from the individual disappearing from the frame of the image of a surveillance camera 10 to appearing in the frame of the image of the next surveillance camera 10) with the average inter-camera traveling time stored in the inter-camera path DB 50, and calculates the difference thereof (S303).

Then the image information processing apparatus 40 compares the difference of the traveling time of the key individual between the surveillance cameras 10 and the difference of the traveling time of other individuals between the same surveillance cameras 10 using the contact determining unit 43, and determines whether contact occurred (S305). In concrete terms, contact determination can be executed as follows.

It is assumed that the time required for a plurality of (two in this example) individuals to contact between the surveillance camera 10A and the surveillance camera 10B (that is, the traveling time between the surveillance cameras 10 plus the time when these individuals contacts) is s. The moment when the key individual disappeared from the frame of the surveillance camera 10A is t1, the moment when the key individual appeared in the frame of the surveillance camera 10B is t1', the moment when the other individual disappeared from the frame of the surveillance camera 10A is t2, and the moment when the other individual appeared in the frame of the surveillance camera 10B is t2'.

min (t1', t2") is t1' or t2' that is earlier. max (t1, t2) is t1 or t2 that is later.

If the conditions min (t1', t2')−max (t1, t2)>s is satisfied in this case, the contact determining unit 43 can determine that these two individuals are likely to have contacted with each other.

The list creating unit 45 of the image information processing apparatus 40 outputs information related to combinations of individuals who are likely to have contacted with each other descending in order of the probability of contact determined by the contact determining unit 43. The degree of this probability can be regarded to be higher as the value of min (t1', t2')−max (t1, t2) is greater in the contact determination in S305.

Time when the key individual and another individual remained outside the imaging range of the surveillance camera 10 is estimated by this processing, and as a result a list of individuals likely to have contacted with the key individual can be created.

1.4 Hardware Configuration

An example of a hardware configuration when the above mentioned image analyzing apparatus 20 and the image information processing apparatus 40 are implemented as the information processing apparatus 100, which is a computer, will be described with reference to FIG. 4. The image analyzing apparatus 20 and the image information processing apparatus 40 may be implemented as independent computers respectively, or may be implemented as one computer.

Figure 4:
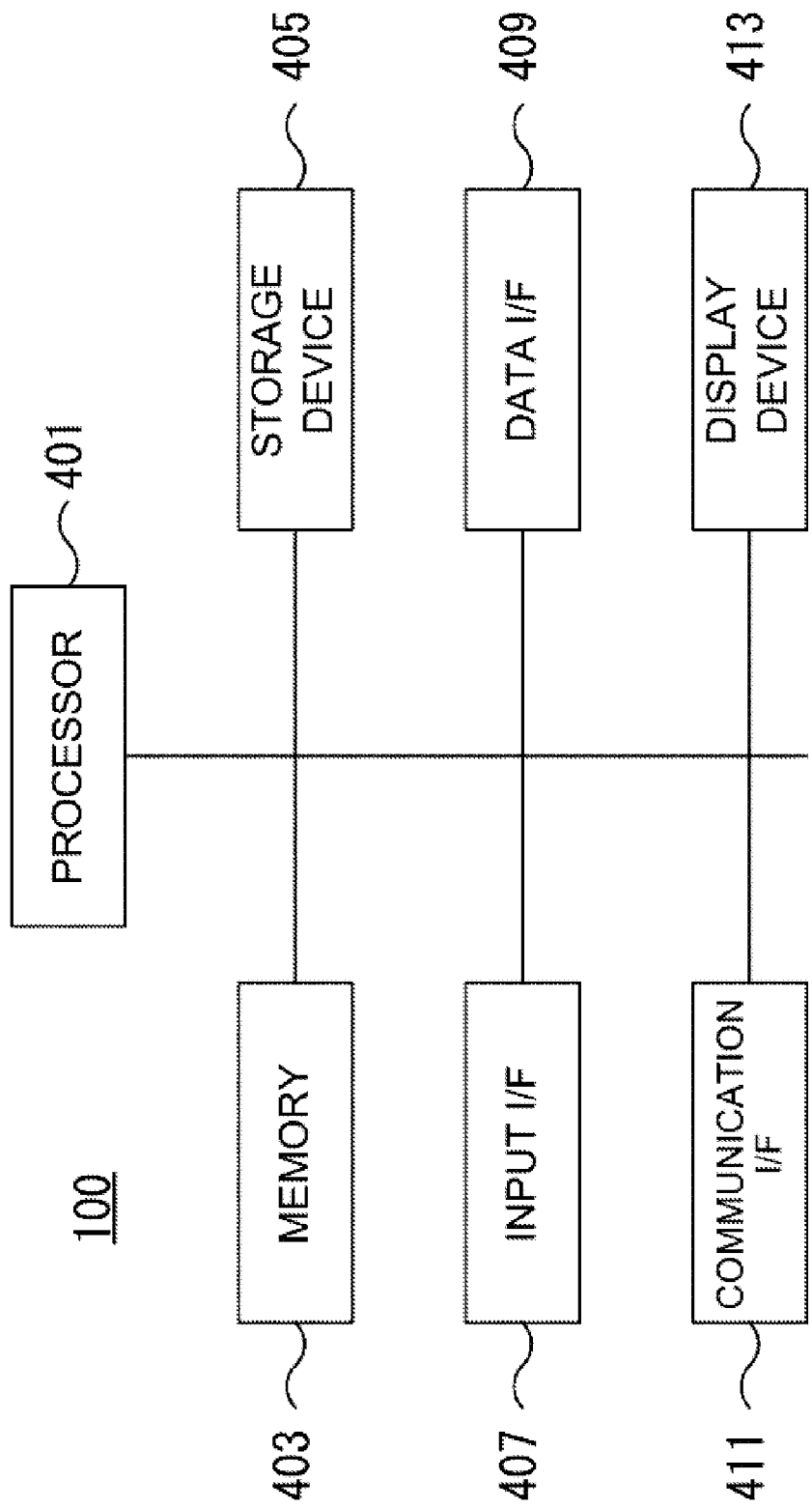
FIG. 4 is a block diagram depicting a configuration of hardware where the apparatus in FIG. 1 can be installed.

As illustrated in FIG. 4, the information processing apparatus 100 includes a processor 401, a memory 403, a storage device 405, an input interface (I/F) 407, a data I/F 409, a communication I/F 411 and a display device 413.

The processor 401 controls various processing in the information processing apparatus 100 by executing the programs stored in the memory 403. The processing operations related to each functional block of the image analyzing apparatus 20 and the image information processing apparatus 40 described with reference to FIG. 1 can be implemented as programs which are temporarily stored in the memory 403, and mainly run on the processor 401.

The memory 403 is a storage medium, such as random access memory (RAM). The memory 403 temporarily stores the program codes of the programs executed by the processor 401 and the data required for executing the programs. For example, a stack area, which is required for executing programs, is secured in the storage area of the memory 403.

The storage device 405 is a non-volatile storage medium, such as a hard disk and a flash memory. The storage device 405 can store the operating system, various programs for implementing each functional block of the image analyzing apparatus 20 and the image information processing apparatus 40, and various data related to the individual's information storage DB 30 and the inter-camera path DB 50. The programs and the data stored in the storage device 405 are loaded to memory 403 when necessary, and are referred to by the processor 401.

The input I/F 407 is a device for receiving input from the user. In concrete terms, the input I/F 407 is, for example, a keyboard, a mouse, a touch panel and various sensors. The input I/F 407 may be connected to the information processing apparatus 100 via such an interface as universal serial bus (USB).

The data I/F 409 is a device for inputting data from outside the information processing apparatus 100. In concrete terms, the data I/F 409 is, for example, a drive for reading the data stored in various storage media. The data I/F 409 is connected to the information processing apparatus 100 via such an interface as USB.

The communication I/F 411 is a device for communicating data between the information processing apparatus 100 and an external device, such as a surveillance camera 10, via cable or radio. The communication I/F 411 could be installed outside the information processing apparatus 100. In this case, the communication I/F 411 is connected to the information processing apparatus 100 via such an interface as USB, for example.

The display device 413 is a device for displaying various information. In concrete terms, the display device 413 is, for example, a liquid crystal display or an organic electro-luminescence (EL) display. The display device 413 may be installed outside the information processing apparatus 100. In this case, the display device 413 is connected to the information processing apparatus 100 via a display cable, for example.

1.5 Effect of this Exemplary Embodiment

As mentioned above, according to this embodiment, even if a blind spot is generated among the surveillance cameras 10 installed on a street, it can be determined whether individuals were more likely to contact with each other. Thereby the selling and buying of illegal products on the street can be exposed, and the infection route of a new virus from a carrier can be specified, for example.

In other words, whether individuals who contacted with each other can be estimated without installing the surveillance cameras 10 in such a way that no blind spot is generated, hence the installation cost of surveillance cameras can be reduced.

1.6 Modifications

The above embodiment was described assuming that there are two surveillance cameras 10, but the number of surveillance cameras 10 is not limited to this, and N (N=3 or more) number of surveillance cameras 10 may be used to specify individuals who were likely to contact with each other. In the case of N number of surveillance cameras 10 as well, the inter-camera traveling time data for a same number of passage routes among each surveillance camera 10 is stored in the inter-camera path DB 50 in advance, then a contact that occurred in blind spots between the surveillance cameras 10 on each route can be determined, and as a result images in a wider range can be monitored.

Whether an unspecified two individuals contacted between surveillance cameras may be determined without specifying a key individual. In this case, an individual ID is assigned to each individual detected in the monitoring area, and whether each individual contacted with each other can be determined. If the processing is executed in real-time, an alert (warning) may be generated when a combination of individuals, who were most likely to have contacted each other for a longer time than a threshold, is detected. Thereby a warning for an event that may have occurred at a location that is not captured by the surveillance camera 10 can be sent to the surveillant, and the surveillance operation can be more efficient.

2 Exemplary Embodiment 2

Figure 5:
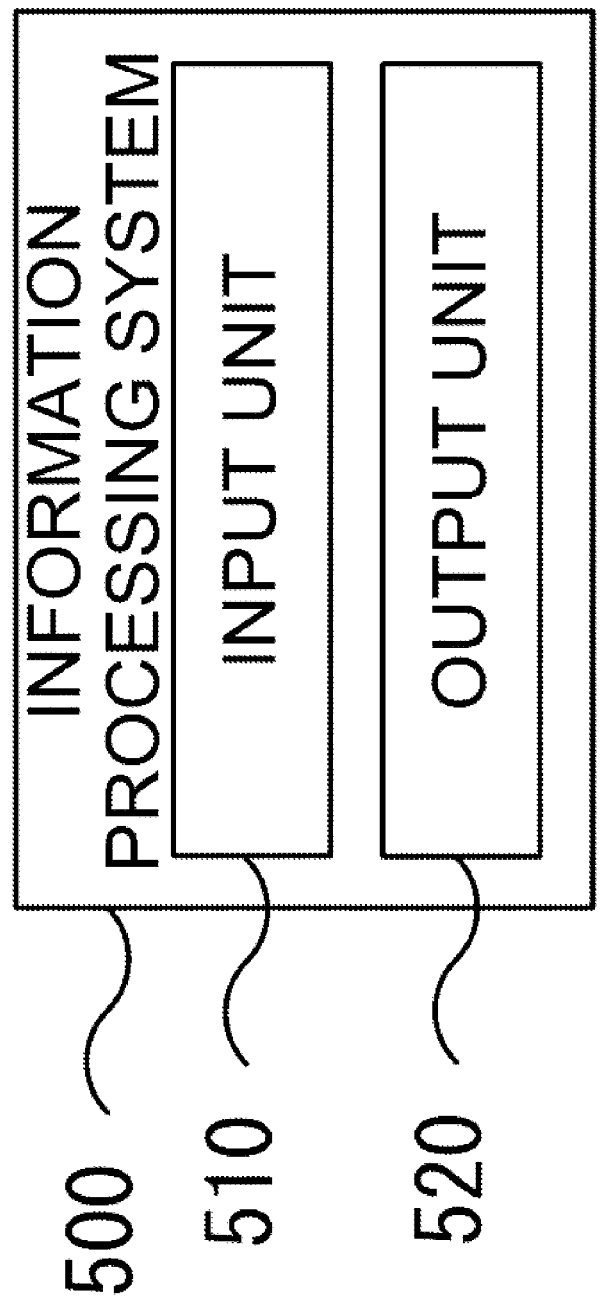
FIG. 5 is a functional block diagram depicting a general configuration of an information processing system according to Exemplary Embodiment 2.

Exemplary Embodiment 2 will now be described with reference to FIG. 5. FIG. 5 is a block diagram depicting a functional configuration of an information processing system 500 according to Exemplary Embodiment 2. As illustrated in FIG. 5, the information processing system 500 includes an input unit 510 and an output unit 520.

The input unit 510 can receive the input of images captured by a plurality of imaging apparatuses, including a first imaging apparatus and a second imaging apparatus, which are not illustrated.

The output unit 520 outputs information on two individuals when each of the two individuals satisfies the conditions of the moment of disappearing from the frame of an image of one of the first imaging apparatus and a second imaging apparatus, and the moment of appearing in the frame of an image of the other imaging apparatus.

According to this information processing system 500 of this embodiment that has this configuration, an information processing system, an information processing method and a program, that allows detecting probability of contacts between individuals outside the imaging ranges of the surveillance cameras, can be provided.

3 Supplementary Notes

The composing elements of the above mentioned exemplary embodiments may be combined or partially replaced.

The configuration of the present invention is not limited to the above mentioned exemplary embodiments, but may be modified and changed without departing from the true spirit and scope of the invention.

A part or all of each exemplary embodiment described above could be written as the following additions, but the present invention is not limited to this. The program of the present invention can be a program that allows a computer to execute each operation described in each exemplary embodiment.

(Supplementary Note 1)

An information processing system, comprising: an input unit that receives input of images captured by a plurality of imaging apparatuses including a first imaging apparatus and a second imaging apparatus: and an output unit that outputs information on two individuals when each of the two individuals satisfies conditions of a moment of disappearing from the frame of an image of one of the first imaging apparatus and the second imaging apparatus and a moment of appearing in the frame of an image of the other one of the first imaging apparatus and the second imaging apparatus.

(Supplementary Note 2)

The information processing system according to supplementary note 1, wherein the output unit outputs the information on the two individuals when the difference, between the later of the moments when the two individuals disappeared from the frame of an image of one of the first imaging apparatus and the second imaging apparatus, and the earlier of the moments when the two individuals appeared in the frame of an image of the other one of the first imaging apparatus and the second imaging apparatus, is a threshold or more.

(Supplementary Note 3)

The information processing system according to supplementary note 2, wherein when there are a plurality of combinations of the two individuals, the difference of which is the threshold or more, the output unit outputs information on the combinations in descending order of a value of the difference.

(Supplementary Note 4)

The information processing system according to any one of supplementary notes 1 to 3, further comprising a determination unit that determines whether the individual in the image captured by the first imaging apparatus and the individual in the image captured by the second imaging apparatus are the same individual.

(Supplementary Note 5)

An information processing method for an information processing system, the method executing: receiving input of images captured by a plurality of imaging apparatuses, including a first imaging apparatus and a second imaging apparatus; and outputting information on two individual when each of the two individuals satisfies the conditions of a moment of disappearing from the frame of an image of one of the first imaging apparatus and the second imaging apparatus and a moment of appearing in the frame of an image of the other one of the first imaging apparatus and the second imaging apparatus.

(Supplementary Note 6)

A program for a computer to execute: processing to receive input of images captured by a plurality of imaging apparatuses, including a first imaging apparatus and a second imaging apparatus; and processing to output information on two individuals when each of the two individuals satisfies the conditions of a moment of disappearing from the frame of an image of one of the first imaging apparatus and the second imaging apparatus and a moment of appearing in the frame of an image of the other one of the first imaging apparatus and the second imaging apparatus.

What is claimed is:

1. An information processing system, comprising:
   an input device that receives input of images captured by a plurality of imaging apparatuses including a first imaging apparatus and a second imaging apparatus: and
   an output device that outputs information on two individuals when each of the two individuals satisfies conditions of a moment of disappearing from the frame of an image of one of the first imaging apparatus and the second imaging apparatus and a moment of appearing in the frame of an image of the other one of the imaging apparatuses.

2. The information processing system according to claim 1, wherein
   the output device outputs the information on the two individuals when the difference, between the later of the moments when the two individuals disappeared from the frame of an image of one of the first imaging apparatus and the second imaging apparatus and the earlier of the moments when the two individuals appeared in the frame of an image of the other one of the first imaging apparatus and the second imaging apparatus, is a threshold or more.

3. The information processing system according to claim 2, wherein
   when there are a plurality of combinations of the two individuals, the difference of which is the threshold or more, the output device outputs information on the combinations in descending order of a value of the difference.

4. The information processing system according to any one of claim 1, further comprising a determination unit device that determines whether the individual in the image captured by the first imaging apparatus and the individual in the image captured by the second imaging apparatus are the same individual.

5. An information processing method for an information processing system,
   the method comprising:
   capturing images, by a plurality of image apparatuses, images including a first imaging apparatus and a second imaging apparatus;
   determining by a processor of a computing device whether each of two individuals satisfies a condition of a moment of disappearing from a frame of an image of one of the first imaging apparatus and the second imaging apparatus, and a moment of appearing in a frame of an image of another of the first imaging apparatus and the second imaging apparatus; and
   in response to determining that each of the two individuals satisfies the condition, outputting by the processor information regarding the two individuals.

6. A non-transitory computer-readable storage medium stored a computer program, the program for a computer to execute:
   processing to receive input of images captured by a plurality of imaging apparatuses, including a first imaging apparatus and a second imaging apparatus; and
   processing to output information on two individuals when each of the two individuals satisfies the conditions of a moment of disappearing from the frame of an image of one of the first imaging apparatus and the second imaging apparatus and a moment of appearing in the frame of an image of the other one of the first imaging apparatus and the second imaging apparatus.

* * * * *